Figure 1:
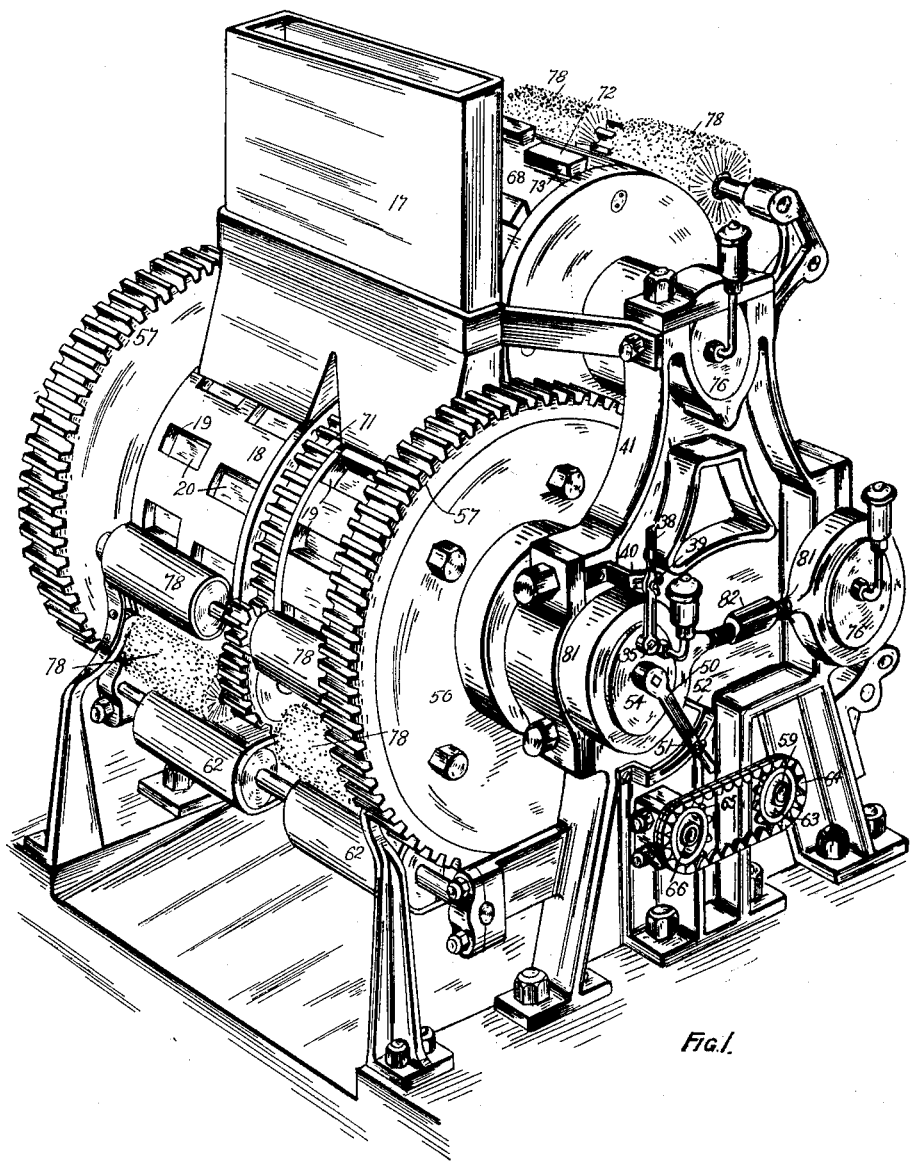

V. KARBOWSKY.
ROTARY MOLDING AND COMPRESSION MACHINE.
APPLICATION FILED AUG. 21, 1913.

1,112,455.

Patented Oct. 6, 1914.
7 SHEETS—SHEET 1.

V. KARBOWSKY.
ROTARY MOLDING AND COMPRESSION MACHINE.
APPLICATION FILED AUG. 21, 1913.

1,112,455.

Patented Oct. 6, 1914.
7 SHEETS—SHEET 2.

V. KARBOWSKY.
ROTARY MOLDING AND COMPRESSION MACHINE.
APPLICATION FILED AUG. 21, 1913.
1,112,455.
Patented Oct. 6, 1914.
7 SHEETS—SHEET 6.
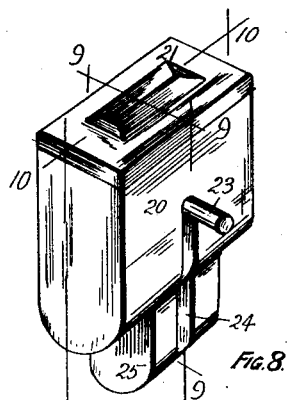
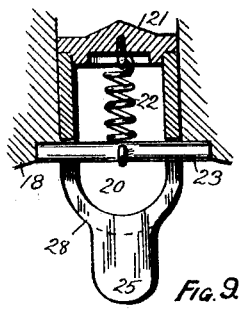
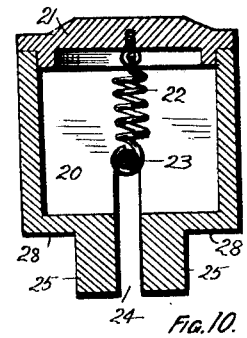
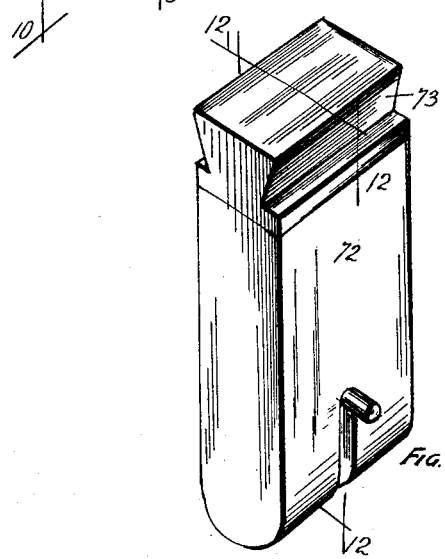
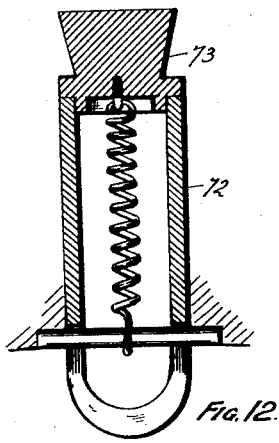
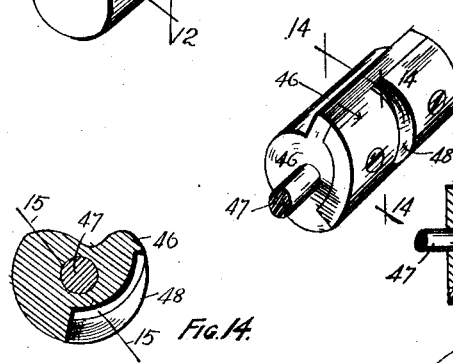
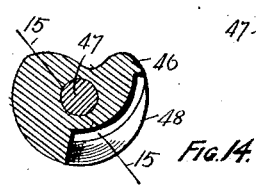
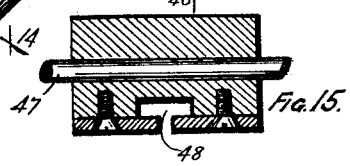

UNITED STATES PATENT OFFICE.

VICTOR KARBOWSKY, OF TEMPE, NEW SOUTH WALES, AUSTRALIA.

ROTARY MOLDING AND COMPRESSION MACHINE.

1,112,455.         Specification of Letters Patent.         Patented Oct. 6, 1914.

Application filed August 21, 1913. Serial No. 785,908.

*To all whom it may concern:*

Be it known that I, VICTOR KARBOWSKY, a subject of the Czar of Russia, residing in South street, Tempe, in the State of New South Wales, Commonwealth of Australia, have invented certain new and useful Improvements in Rotary Molding and Compression Machines, of which the following is a specification.

This invention refers to the molding and compression, prior to the hardening, annealing or vitrifying process, of building blocks, bricks or such like articles composed of material plastic during manufacture, and specifically to molding machines of the type comprising a rotatable barrel having peripheral molds each containing a piston for supporting the charge during compression and operating to eject the molded block, said molds being entered for charge compression purposes at their outer ends by supported surfaces of the periphery of a further barrel rotating synchronously with the main and mold barrel. And the objective of the present invention is to effect such structural improvements and additions to machines of the type before specified as to provide an improved machine for the purpose, combining positive action with simplicity of construction and adaptability for ready renewal and repair of the working integers or parts, and further so that the compression operation is not only increased but is effected in progressive steps along the barrel thus decreasing the strain imparted to the barrel shaft and bearings. And according to this invention these improvements consist essentially in disposing the peripheral molds in the barrel in staggered longitudinal series (the molds in a circumferential plane being equi-distant from each other); providing in each of the mold cavities a spring returned piston operating to support the charge during compression and to finally eject same and being supported and actuated by fixed cams on the central shaft about which said barrel rotates; effecting the compression operation in each mold by means of the entrance into each of a plunger similarly disposed and operated as the pistons before described, the barrel carrying such plungers being arranged for synchronous rotation with the main barrel; and the means for adjusting the capacity of the molds and the degree of compression as hereinafter fully described with the aid of the accompanying drawings and claimed in the appended claims.

Figure 2:
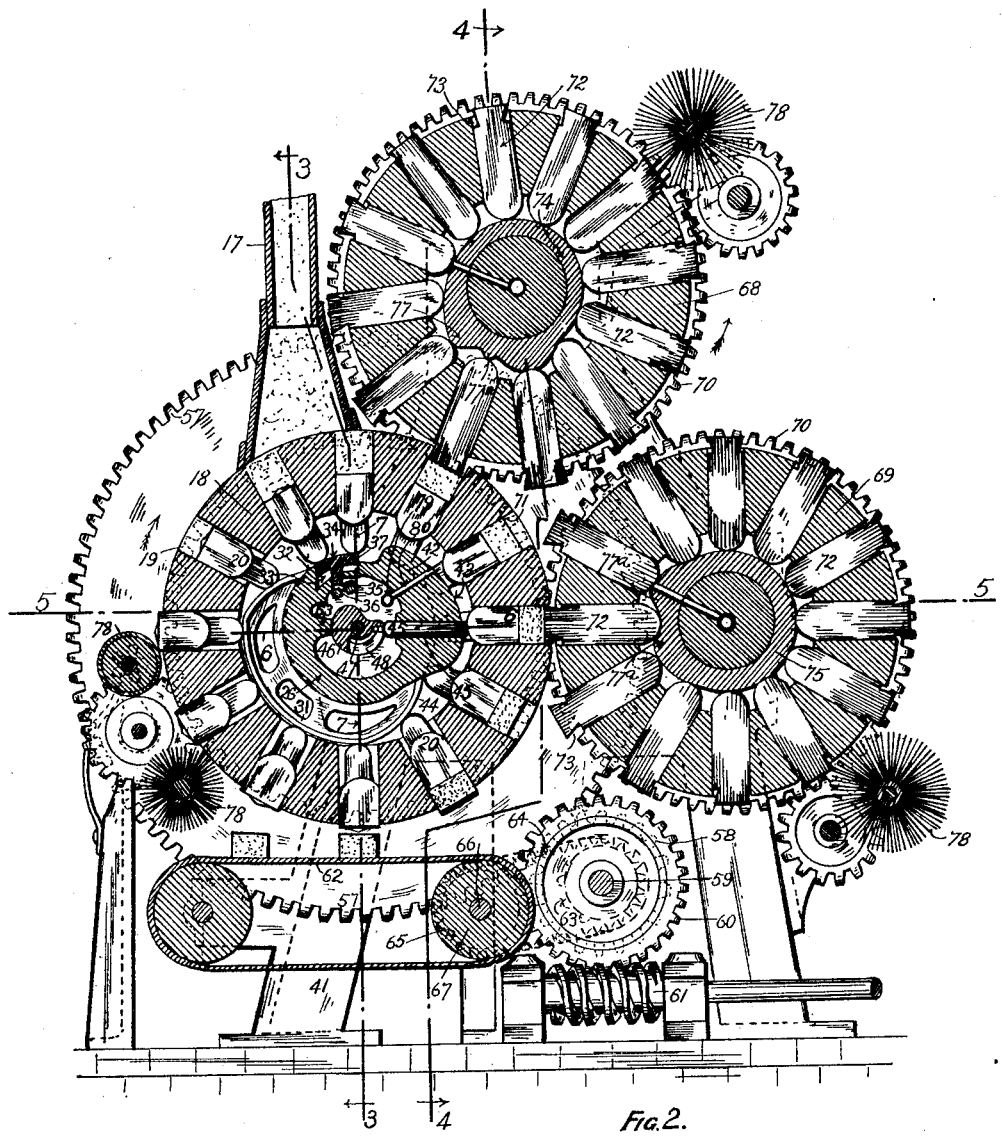
Figure 3:
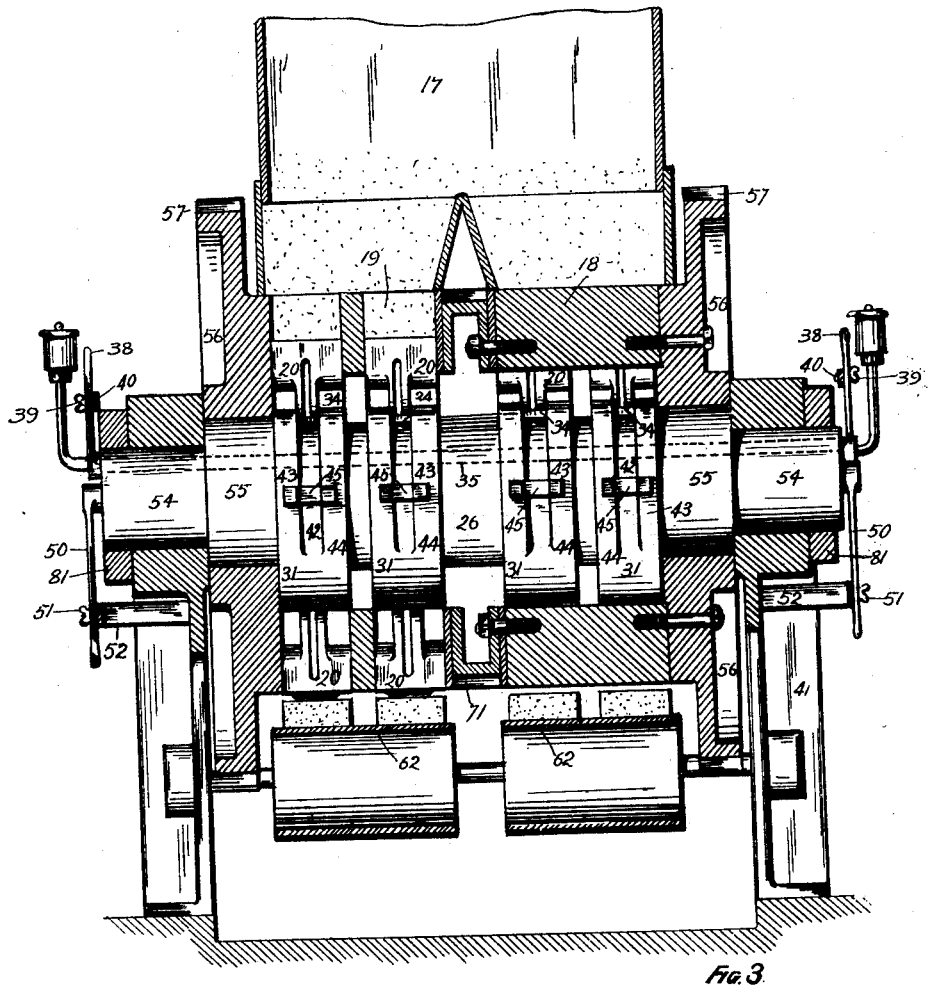
Figure 4:
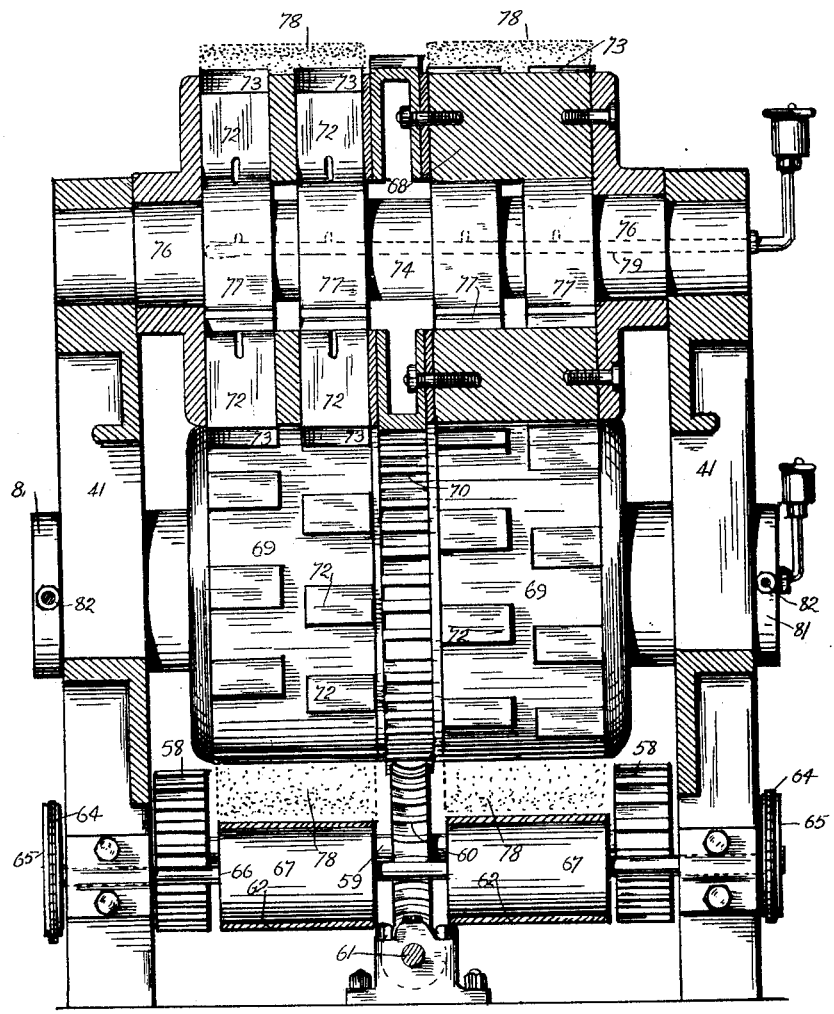
Figure 5:
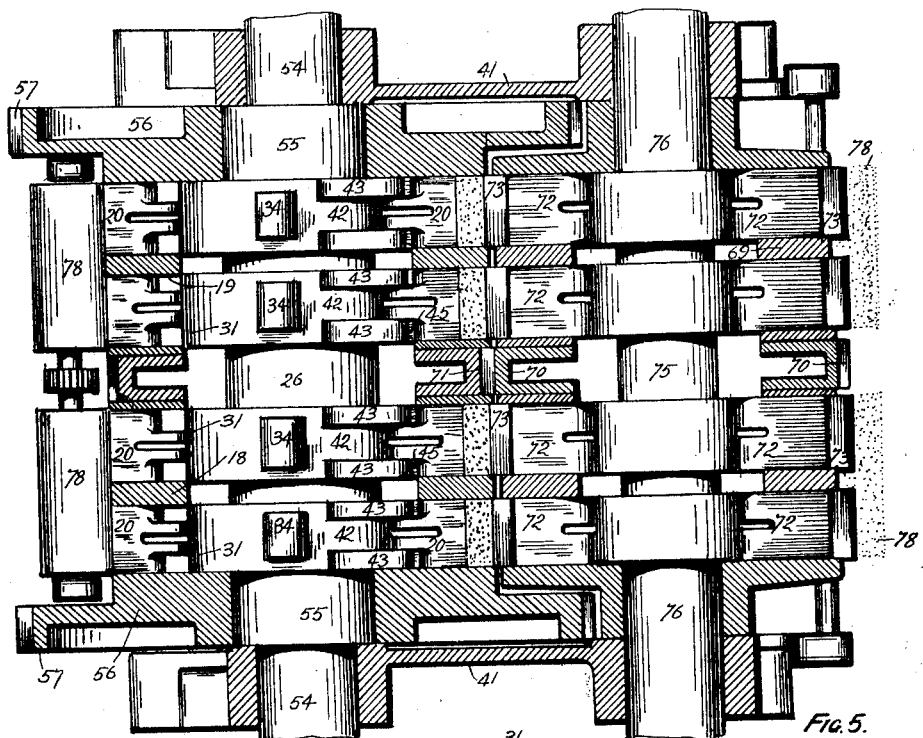
Figure 6:
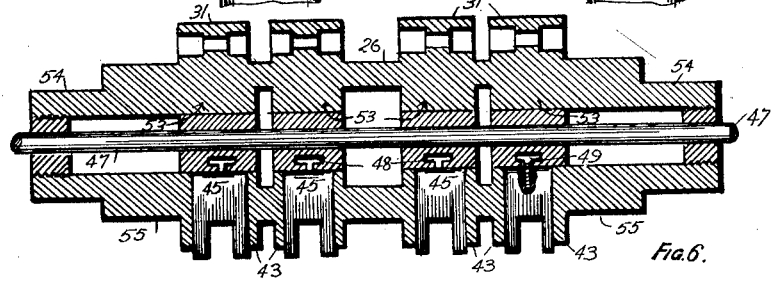
Figure 7:
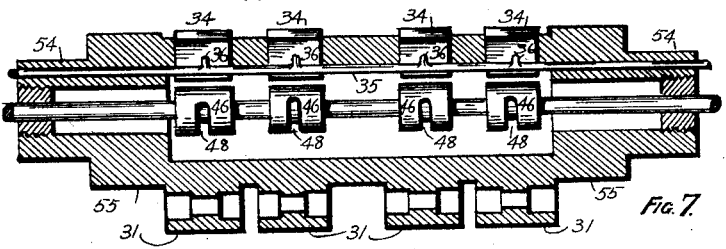
Figure 16:
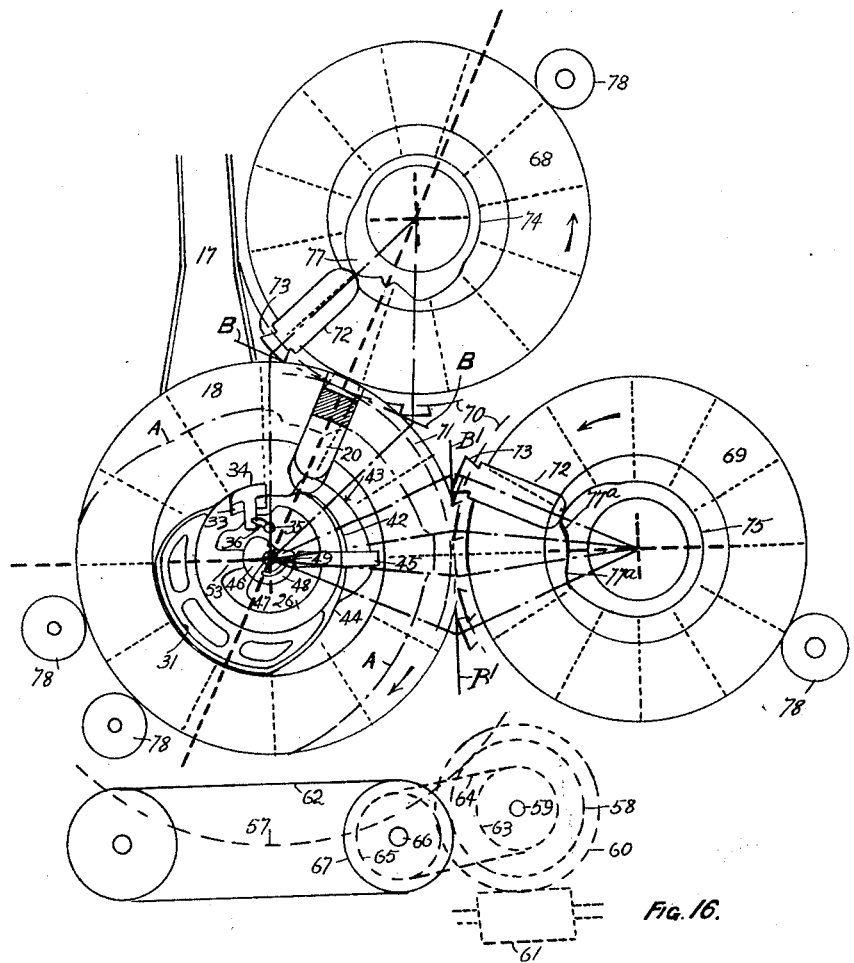

Referring to the accompanying drawings:—Figure 1 is perspective view of a rotary molding machine according to this invention. Fig. 2 is vertical section of machine. Fig. 3 is section on line 3—3 of Fig. 2. Fig. 4 is section on line 4—4 of Fig. 2. Fig. 5 is section on line 5—5 of Fig. 2. Fig. 6 is section on line 6—6 of Fig. 2. Fig. 7 is section on line 7—7 of Fig. 2. Fig. 8 is enlarged perspective view of one of the mold pistons employed in the main barrel, Figs. 9 and 10 being sections of the same on planes 9—9 and 10—10 respectively of Fig. 8. Fig. 11 is similar view to Fig. 8 of one of the pistons in the supplementary barrels and employed for block compression purposes, Fig. 12 being section of the same on plane 12—12 of Fig. 11. Fig. 13 is perspective view of adjustable cam device supporting the pistons in the main barrel during the final block compression operation, Fig. 14 being cross section on plane 14—14 of Fig. 13, and Fig. 15 a longitudinal section of the same, and Fig. 16 is a diagrammatic vertical section illustrating more clearly the relative operation of the pistons and plungers before referred to.

The rectangular hopper or chute 17 disposed above the main barrel 18 delivers the plastic material to the plurality of peripheral molds 19 in said barrel, which molds 19 are arranged in echelon longitudinally and disposed in circumferential equi-distant series as shown, (see Figs. 1 and 4) and to prevent the escape of any material between the delivery orifice of the hopper 17 and the periphery of said barrel 18, the lower end of the hopper fits closely on said periphery.

Each of the rectangular molds 19 has operating therein a hollow piston 20 (see Figs. 8, 9 and 10) the outer ends of which are closed by a cap 21 secured in position by a spring 22 attached to the underneath surface of same and to the through rod 23 terminally held in the peripheral wall of the barrel 18 and passing through the slot 24 centrally positioned in said piston 20 as shown; and said spring also acts to return the piston 20 within the mold cavities as hereinafter set out. The inner end 25 of said pistons 20 is reduced and terminally rounded as are also the shoulders 28 which with said reduced end bear upon the surfaces of cam barrel 26.

The hollow cam barrel 26 positioned longitudinally and centrally within the main barrel 18 has provided thereon the projecting surfaces 31 each concentric to the periphery of the barrel 18 for maintaining the pistons at the limit of their outward stroke until approaching the hopper when said surface recedes to form the cam face 32 permitting retraction of the pistons 20 to form the mold cavities (see Fig. 2) to be charged.

The top end of each of the concentric surfaces 31 (corresponding to the number of pistons in longitudinal series) terminates in a housing recess 33 in the cam barrel, provided for the vertically adjustable T-shaped supporting plates 34 for the pistons when disposed below and receiving a charge from the hopper 17. These T-plates 34 are adjusted vertically to regulate the depth of the molds 19 by means of a through rod 35 having offset fingers 36 taking in a slot 37 provided in the vertical members of each of said plates 34. The through rod 35 has a terminal handle 38 for adjustment purposes said handle being secured in set position by a wing nut 39 passing through the angular bracket 40 affixed to the frame member 41 of the machine (see Fig. 1). Positioned ahead of said T-plates 34 on the cam barrel 26 are the approximately parallel cam surfaces 42 and 43 the inner 42 of which support the inner ends and the outer 43 supports the shoulders 28 of the pistons 20 during the compression operations hereinafter described. The cam surfaces 42 each terminate at the lower end in a cam surface 44 which acts to force the pistons 20 outwardly and effect discharge of the compressed charges from the molds 19, said surface 44 merging into the concentric surfaces 31 hereinbefore described.

For the purpose of rigidly backing the shoulders 28 of the pistons 20 during the final compression step, horizontal backing plates 45 are provided passing through the wall of the cam barrel 26 and supported at their inner ends by the cam 46 adjustable for the purpose hereinafter stated being mounted on the through shaft 47 and provided with slot 48 engaging the T head 49 attached to the backing plate 45, the said shaft having terminal handle 50 held secure by a wing nut 51 passing therethrough and through the slotted quadrant plate 52 affixed to the machine framing member 41. The said cam 46 is supported on the opposite side to that of the backing plates 45 by an internal rib 53 on the inner surface of the cam barrel 26 (see Figs. 2 and 16).

The cam barrel 26 has terminally reduced portions 54 fixed in the vertical framing members 41 and the main barrel 18 rotates on the portions 55 of said cam barrel, the circular plates 56 closing the ends of the barrel 18 being fitted over said portions 55 (see Fig. 3). The end plates 56 of the barrel 18 have peripheral spur wheels 57 meshing with gear wheels 58 mounted on the transverse shaft 59 rotated by worm wheel 60 meshing with worm power shaft 61 (see Figs. 2 and 4).

For driving the off-take apron conveyer 62 a sprocket 63 is provided on the shaft 59 which is connected by a toothed belt 64 to the sprocket 65 affixed to the shaft 66 of the driving roller 67 of the said conveyer 62.

Positioned ahead of the hopper in the direction of rotation of the main barrel are the barrels 68 and 69 of similar but smaller construction to said main barrel 18 and each gearing by a central spur wheel 70 with a similar spur wheel 71 on the main barrel.

The plungers 72 contained in each of the barrels 68 and 69 are each provided with clearance recesses 73 at their outer ends and are operated by cam barrels 74 and 75 contoured as and for the purpose hereinafter described. The ends of the cam barrels 74 and 75 are each secured to the frame members 41 and the barrels 68 and 69 rotate about the bosses 76. As molds are not required in the periphery of the barrels 68 and 69 it is not necessary to retract the plungers 72 below the peripheral surface of said barrels (see Figs. 2 and 16).

In use the plastic material being fed into the hopper 17 by any suitable means as from an overlying pug-mill, and the barrels 18, 68 and 69 rotating in the direction indicated by the arrows in Figs. 2 and 16, the pistons 20 disposed immediately below the hopper will be retracted (the inner ends being supported by the T plates 34) to form the molds 19 to receive a charge of the material. The charged molds now proceeding toward the uppermost 68 of the supplementary barrels the opposing series of plungers 72 in such barrel will register in the same. This registration will be effected by the peculiarly shaped cam portion 77 on the cam barrel 74 (see Figs. 2 and 16) consisting of three peaks conjoined by flatted portions, the central peak operating to impart a sudden and limited outward movement to the plungers for effecting preliminary solidification of the charges.

The partly compressed charges in the main barrel 18 now proceeding to the lower 69 of the supplementary barrels, the pistons 20 will be moved slightly outward by the cam surfaces 42 and 43 and the opposing plungers 72 in said lower barrel will be protruded from their housings by the peaked cam portion 77ª on the cam barrel 75 to bear upon the outer faces of the previously partly compressed charges. Proceeding, the pistons 20 will have further outward movement imparted to them by the bifurcated backing plates 45 taking against the shoulders 28 while the plungers 72 will travel in a chordal line by reason of the depression contained between said peaked cam portion 77ᵃ on the cam barrel 75, as hereinafter explained. At this stage the second and final compression of the charges in the molds 19 is taking place and when effected the cam surface 44 on the cam barrel 26 operates to force the pistons 20 farther out and eject the blocks on to the underlying off-take conveyer 62. The rotating pistons 20 and plungers 72 will now be held at the limit of their outward stroke by the concentric surfaces on the cam barrels 26, 74 and 75 until the cycle of operations before described again takes place, the following pistons and plungers obviously effecting the same steps.

It is essential in order to avoid jamming of the plungers 72 in the molds of the main barrel 18, that the faces of the said plungers should progress at exactly the same rate as the particular portion of the said molds which they occupy and to effect this the cam surfaces 77 and 77ᵃ are so formed that from the point of first entrance of the plungers into the molds until complete withdrawal occurs, the path of the said plungers 72 is in effect a chord of the main barrel (except where the center peak in surface 77 operates momentarily) which chord is at any point of its length equidistant from the axial centers of the main and supplementary drum, the retractive contour of the surfaces 77 and 77ᵃ being to eliminate the effect of angular variation of the plungers 72. This feature is clearly illustrated in Fig. 16 of the drawings which is included mainly for that purpose, and also being more clear in its delineation to enable the parts to be more clearly indicated by the reference numerals. And in the said Fig. 16 the path of the pistons 20 of the main barrel is indicated by the dotted line marked A, and the chordal path of the plungers 72 of the supplementary barrels 68 and 69 by the letters B and B′ respectively. During the passage of the inner ends of the pistons 20 and plungers 72 along the concentric surfaces mentioned the removal of any material from their outer ends will be effected by the rotary brushes 78 (see Figs. 1, 2 and 4). It also being essential that the supplementary barrels 68 and 69 should have synchronous rotation, the axial centers of same are located on a common circumferential line struck from the axial center of the main barrel 18 and the said supplementary barrels are so disposed as not to effect intermeshing of their gear wheels.

Lubrication of the cam surfaces is effected where required through the hollow shaft 79 from which branches 80 lead to the surfaces as shown in Fig. 2.

To eliminate the risk of fracture of the framing 41 by reactive force occasioned by the final compression operations the ends of the cam barrels 26 and 75 are held in rigid relative position by straps 81 connected by a union nut 82 as shown in Fig. 1.

What I claim and desire to secure by Letters Patent is:—

1. In rotary molding and compression machines for plastic material, in combination, a rotary barrel having a plurality of peripheral molds, each containing a spring held piston, a fixed hollow cam barrel contained within said barrel, concentric surfaces 31 and cam surfaces 34, 44, 42 and 43 on said cam barrel, cams contained within said cam barrel and supported by an internally projecting rib on the latter, said cams slotted and adjustable radially by a through rod passing through the ends of the said barrel, and piston backing plates 45 supported by said cams, T-shaped piston backing plates housed within and passing through the wall of said cam barrel, and a through rod having fingers taking in a slot in each of said T-plates, as herein set forth.

2. In rotary molding and compression machines for plastic material, in combination, a rotary barrel having a plurality of peripheral molds each containing a hollow piston 20 having a reduced end and rounded inner edges, a cap closing the outer end of each of said pistons, a central slot in said pistons and a through rod in said slot, said rods held in the wall of the rotary barrel and connected to said caps by springs as herein set forth.

3. In rotary molding and compression machines for plastic material, in combination, a rotary barrel having a plurality of peripheral molds each containing a spring held piston, a pair of supplementary barrels rotating synchronously and gearing with said rotary mold barrel, spring held radial plungers in said supplementary barrels, said plungers having clearance recesses in their outer ends, cam barrels 74 and 75 contained one in each of said supplementary barrels, cam surfaces 77 on said cam barrel 74 and cam surfaces 77ᵃ on said barrel 75, as herein specified.

4. In rotary molding and compression machines for plastic material, in combination, a rotary barrel having a plurality of circumferential series of mold cavities arranged in echelon longitudinally of the barrel, spring held pistons contained within each of said cavities, a fixed hollow cam barrel contained within said barrel, concentric surfaces 31 and cam surfaces 34, 44, 42 and 43 on said cam barrel, cams contained within said cam barrel and supported by an internally projecting rib on the latter, said cams slotted and adjustable radially by a through rod passing through the ends of said barrel, piston backing plates 45 supported by said cams, T-shaped piston backing plates housed within and passing through the wall of said cam barrel, a through rod having fingers taking in a slot in each of said T-plates and passing through the rotary mold barrel, a hopper or chute superposing said rotary barrel, a pair of supplementary barrels gearing with said rotary mold barrel, spring held radial plungers in said supplementary barrels, clearance recesses in the outer ends of said plungers, cam barrels 74 and 75 contained one in each of said supplementary barrels, cam surfaces 77 on said cam barrel 74 and cam surfaces 77$^a$ on said cam barrel 75, vertical framings 41 containing and supporting said mold and supplementary barrels, as herein set forth.

5. In rotary molding and compression machines for plastic material, in combination, a rotary barrel having a plurality of circumferential series of mold cavities arranged in echelon longitudinally of the barrel, spring held pistons contained within each of said cavities, a fixed hollow cam barrel contained within said barrel, concentric surfaces 31 and cam surfaces 34, 44, 42 and 43 on said cam barrel, cams contained within said cam barrel and supported by an internally projecting rib on the latter, said cams slotted and adjustable radially by a through rod passing through the ends of said barrel, piston backing plates 45 supported by said cams, T-shaped piston backing plates housed within and passing through the wall of said cam barrel, a through rod having fingers taking in a slot in each of said T-plates and passing through the rotary mold barrel, a hopper or chute superposing said rotary barrel, a pair of supplementary barrels gearing with said rotary mold barrel, spring held radial plungers in said supplementary barrels, clearance recesses in the outer ends of said plungers, cam barrels 74 and 75 contained one in each of said supplementary barrels, cam surfaces 77 on said cam barrel 74 and cam surfaces 77$^a$ on said cam barrel 75, vertical framings 41 containing and supporting said mold and supplementary barrels, an off-take belt conveyer positioned below said mold barrel and driven by a sprocket on a transverse shaft geared to the power shaft a toothed belt connecting said sprocket to a further sprocket on the shaft of the driving roller of said conveyer, as herein set forth.

6. In rotary molding and compression machines for plastic material, in combination, a rotary barrel having a plurality of circumferential series of mold cavities arranged in echelon longitudinally of the barrel, spring held pistons contained within each of said cavities, a fixed hollow cam barrel contained within said barrel, concentric surfaces 31 and cam surfaces 34, 44, 42 and 43 on said cam barrel, cams contained within said cam barrel and supported by an internally projecting rib on the latter, said cams slotted and adjustable radially by a through rod passing through the ends of said barrel, piston backing plates 45 supported by said cams, T-shaped piston backing plates housed within and passing through the wall of said cam barrel, a through rod having fingers taking in a slot in each of said T-plates and passing through the rotary mold barrel, a hopper or chute superposing said rotary barrel, a pair of supplementary barrels gearing with said rotary mold barrel, spring held radial plungers in said supplementary barrels, clearance recesses in the outer ends of said plungers, cam barrels 74 and 75 contained one in each of said supplementary barrels, cam surfaces 77 on said cam barrel 74 and cam surfaces 77$^a$ on said cam barrel 75, vertical framings 41 containing and supporting said mold and supplementary barrels, an off-take belt conveyer positioned below said mold barrel and driven by a sprocket on a transverse shaft geared to the power shaft a toothed belt connecting said sprocket to a further sprocket on the shaft of the driving roller of said conveyer, peripheral spur wheels on the closed circular ends of said mold barrel, gearing with spur wheels mounted on an underlying transverse shaft rotated by a worm wheel meshing with a worm power shaft, and rotary brushes having peripheral contact with the outer ends of the pistons in the mold barrel and of the plungers in the supplementary barrels, as herein set forth.

Signed at Sydney, New South Wales, this eleventh day of July, 1913.

VICTOR KARBOWSKY.

Witnesses:
CHAS. HATTON,
WM. NEWTON.

---

Copies of this patent may be obtained for five cents each, by addressing the "Commissioner of Patents, Washington, D. C."